United States Patent
Hjelm et al.

(10) Patent No.: US 8,341,174 B2
(45) Date of Patent: Dec. 25, 2012

(54) METHOD AND ARRANGEMENT FOR PROVIDING CONTEXT INFORMATION

(75) Inventors: Johan Hjelm, Tokyo (JP); Mattias Lidström, Stockholm (SE); Theo Kanter, Rönninge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 287 days.

(21) Appl. No.: 11/918,266

(22) PCT Filed: Oct. 4, 2005

(86) PCT No.: PCT/SE2005/001461
§ 371 (c)(1), (2), (4) Date: Oct. 25, 2007

(87) PCT Pub. No.: WO2006/115442
PCT Pub. Date: Nov. 2, 2006

(65) Prior Publication Data
US 2009/0132540 A1    May 21, 2009

(30) Foreign Application Priority Data

Apr. 26, 2005 (SE) .................................... 0500946

(51) Int. Cl.
*G06F 7/00* (2006.01)
(52) U.S. Cl. ...................................................... 707/765
(58) Field of Classification Search .................. 707/1, 2, 707/3, 4, 5, 765, 776
See application file for complete search history.

(56) References Cited

U.S. PATENT DOCUMENTS

| | | | |
|---|---|---|---|
| 6,381,465 B1 * | 4/2002 | Chern et al. | 455/466 |
| 2003/0018692 A1 | 1/2003 | Ebling et al. | |
| 2004/0122896 A1 | 6/2004 | Gourraud | |
| 2004/0122977 A1 | 6/2004 | Moran et al. | |
| 2005/0228780 A1 * | 10/2005 | Diab et al. | 707/3 |
| 2006/0123080 A1 * | 6/2006 | Baudino et al. | 709/204 |
| 2007/0220005 A1 * | 9/2007 | Castro Castro et al. | 707/9 |

FOREIGN PATENT DOCUMENTS

| | | |
|---|---|---|
| JP | 200464264 A | 2/2004 |
| WO | 01/45342 A2 | 6/2001 |
| WO | 2004057837 A1 | 7/2004 |

OTHER PUBLICATIONS

Japanese Office Action issued on Dec. 3, 2010 for related Japanese Application No. 2008-508789.
International Search Report for PCT/SE2005/001461, mailed Jan. 19, 2006.
JP Office Action, mailed May 9, 2011 in corresponding JP application No. 2008-508789.

\* cited by examiner

*Primary Examiner* — Amy Ng
(74) *Attorney, Agent, or Firm* — Potomac Patent Group PLLC

(57) ABSTRACT

A method and apparatus for obtaining context information from a context server maintaining a context for an object of interest in a telecommunication network. The context server receives raw context data from sensors associated with the object of interest. A request is received from a requesting party for refined context information with reference to the object of interest. Individual context data is collected for at least one individual entity of the requesting party. A customized rule is created on the basis of the received individual context data. The rule defines conditions in an adapted request for refined context information regarding the object of interest, which is sent, including the customized rule, to the context server of the object of interest. Context data refined according to the customized rule is then received from the context server.

19 Claims, 6 Drawing Sheets

METHOD AND ARRANGEMENT FOR PROVIDING CONTEXT INFORMATION

RELATED APPLICATIONS

This application claims priority and benefit from International Application No. PCT/SE2005/001461, filed Oct. 4, 2005, which claims priority and benefit from Swedish patent application No. 0500946-9, filed Apr. 26, 2005, the entire teachings of which are incorporated herein by reference.

TECHNICAL FIELD

The present invention relates generally to a method and arrangement for providing or obtaining requested context information in a telecommunication network. In particular, the invention is concerned with providing or obtaining context information according to specifications from the requesting party.

BACKGROUND OF THE INVENTION AND PRIOR ART

With the advent of 3G mobile telephony, new packet-based communication technologies have been developed for communicating multimedia content. For example, GPRS (General Packet Radio Service) and WCDMA (Wideband Code Division Multiple Access) technologies support wireless multimedia telephony services involving packet-switched communication of data representing images, text, documents, animations, audio files, video clips, etc., in addition to traditional circuit-switched voice calls. Further, new sophisticated mobile terminals are also emerging on the market, equipped with functionalities to handle the new services, including high resolution colour displays and multiple codecs (coders/decoders) for the different formats. These terminals are also typically capable of different access technologies, depending on network configuration and cell characteristics.

Recently, a service network architecture called "IP Multimedia Subsystem" (IMS) has been developed by the 3$^{rd}$ Generation Partnership Project (3GPP) as an open standard, to provide multimedia services for mobile clients in the packet domain. Generally, IMS is a platform for enabling services based on IP transport, more or less independent of the access technology used and basically not restricted to any limited set of specific services.

A specification for session setup has been defined called "SIP" (Session Initiation Protocol, according to the standard IETF RFC 3261 et al), which is an application-layer signalling protocol for controlling (e.g. creating, modifying and terminating) sessions over a packet-switched logic. SIP is generally used by IMS networks for handling multimedia sessions. Also, extensions of the basic SIP protocol may be used, referred to as "Simple", to handle some services.

FIG. 1 illustrates schematically a greatly simplified basic communication scenario for providing multimedia services by means of an IMS service network. It should be noted that the figure only shows a selection of network elements helpful to understand the background technology for the present invention. Briefly described, a calling mobile terminal A is connected to a first radio access network 100 and communicates with a called mobile terminal B connected to a second radio access network 102, in a communication session S involving one or more multimedia services. Alternatively, terminal A may communicate with a fixed terminal or computer, or with a content server delivering some multimedia content to the terminal, such as a piece of music, a film or a game. The terminals A, B may also communicate with servers in the IMS network providing information services, to be described below.

An IMS network 104 is shown connected to the first radio access network 100 and handles the multimedia session S with respect to terminal A. Thus, the IMS network 104 receives and processes any service requests from terminal A. Similarly, a corresponding IMS network 106 handles the session S on behalf of terminal B, and the two IMS networks 104 and 106 may be controlled by different operators. Alternatively, terminals A and B may of course be connected to the same access network and/or may be served by the same IMS network.

The illustrated session S is controlled, using SIP signalling, by various suitable session managing nodes, generally indicated by a block 108. Typically, the session managing node types include S-CSCF (Serving Call Session Control Function), I-CSCF (Interrogating Call Session Control Function) and P-CSCF (Proxy Call Session Control Function). Invoked multimedia services are enabled and executed by a plurality of application servers 110. Further, a main database element HSS (Home Subscriber Server) 112 stores subscriber and authentication data as well as service information, among other things, that the application servers 110 can fetch for executing services for clients. The various functions of the IMS network elements 108-112 are not necessary to describe here further to understand the present invention. Of course, the IMS network 104 further contains numerous other nodes and functions, which are not shown here for the sake of simplicity.

One example of services that can be employed by means of an IMS network is the so-called "Presence" services. In this type of services, "Presence" is basically a dynamic and variable state profile of a client, and the presence services basically involve the publishing of "presence data" of a client to make it available for other users and applications, which further can be used to control other services in turn. Presence data basically defines the state or situation of a client and his/her equipment in some predefined respect. Thus, the term "presence" is here given a very broad meaning, and the presence data may include, e.g., the following "client states":

A client status, e.g. available, busy, in a meeting, on holiday, etc.

A terminal status, e.g. switched on/off, engaged, out of coverage, etc.

The geographic location of the client/terminal.

Terminal capabilities and selections, e.g. functionality for SMS, MMS, chatting, games, video, etc.

Other personal client information, e.g. interests, occupations, personal characteristics, moods, etc.

This information, or any selected parts thereof, is stored in an application server in the IMS network, based on so-called "publications of events" received from the network or a client, whenever the client changes any of his/her presence data. A client may also subscribe for selected presence data of one or more other users, e.g. according to a list of users. Such presence subscriptions are typically also handled by an application server in the IMS network. The subscribing client can then receive notifications regarding current presence data, either automatically or upon request. In SIP, a message called "SIP PUBLISH" can be used by clients to provide dynamic data to an application server in the IMS network. Further, another SIP message called "SIP SUBSCRIBE" can be used by clients to subscribe for dynamic data of other clients, as handled by the application server.

In traditional telecommunication systems, communication channels are more or less fixed and static, with predictable bitrates and protocols. Using the new access technologies, however, the network environment becomes more dynamic and heterogeneous to users, with great variations of the available communication resources in wireless networks, as different types of connection can be used, even within a call session. As a result, bitrates and modulation and encoding schemes become highly variable. Yet, users moving around in and between networks expect to be able to access and utilize a variety of services regardless of such variations. It is therefore desirable to develop services that can be adapted, or "tailored", to the current user situation and network environment.

Recently, a concept has been developed to provide refined information on objects to increase the usability of applications for invoked services, depending on the object's current situation. An "object" in this respect is typically a human user but may also be a physical device or apparatus, or an enterprise offering merchandise or services to customers. The term "object of interest" will be used in this description to represent any such object. This new concept is generally referred to as the distribution of "context" information, which may be implemented by using similar mechanisms as of the above-described presence services. It is therefore desirable to develop "context-aware" applications to achieve services optimally adapted to the prevailing circumstances.

This may be illustrated by a first example when a telecommunication service involving a navigation aid has been invoked by a mobile user. A context may then be defined in an IMS server for that user, being the object of interest in this case. The context may be maintained in the server e.g. for as long as the user is logged-on, or as long as he/she is a subscriber in the IMS network. An application used for this service may then investigate the current context of the user and provide a map to the user adapted to include or exclude certain features depending on, e.g., the user's preferences, current position and current type of communication connection, as being given by the context. In this case, the context information reflecting the user's situation can thus be used to create an optimal presentation format, i.e. the displayed map.

FIG. 2 illustrates a previously proposed server configuration for providing context information on an object of interest to a requesting entity, or "context consumer". A context server 200 is shown, adapted to provide context information to any authorized user, device or application, generally illustrated here as a "requesting party" 202. It should be noted that the object of interest for which context information is maintained may be a person, device, apparatus, system, etc. Further, the requesting party 202 may likewise be a person, e.g. a presence subscriber as described above, or a device. The requesting party 202 may also be an application being used to enable a service, such as the navigation aid service described above.

The context server 200 includes a context manager 204, an advertiser 206 and an admission control function 208, to be described below. The context manager 204 continuously collects information on the object of interest, here schematically illustrated as a dashed box 210a, by receiving object data from various sources, indicated as sensors S 210. The sensors 210 are adapted to measure or register various "variables" or the like characterizing the current state, status or situation of the object 210a. For example, the sensors may be adapted to measure physical characteristics such as temperature, or to register some current object status such as any of the client states mentioned above for presence services. In another tangible example, the object of interest may be a power switch and a single sensor may then be adapted to simply register whether the switch is on or off.

Raw context data from the sensors 210 is received and stored in a context storage unit 212 in the context manager 204. The stored raw data may then be processed and refined in a context refiner 214 by applying predefined rules 216 on the raw data, in order to derive or calculate new refined context information from the raw data. The predefined rules 216 may include algorithms or the like that calculate certain parameters, draw conclusions or create compilations from the raw data. For example, in the case of the above-mentioned power switch, rules may be defined to derive various statistic parameters. One rule may calculate the total amount of time the switch has been on and off, respectively. Other rules may calculate the maximum, minimum and mean duration of periods it has remained on and off, respectively, and so forth.

The refined context can then be distributed correctly to any requesting party by means of a distributor 218. The requesting party 202 may first discover what context information can be obtained from the context server by checking advertisements or announcements provided by means of some "exposure" mechanism according to suitable information from the advertiser 206. For example, advertisements or announcements regarding available context information may be exposed, as indicated in the figure by a dashed line, by means of a separate server or the like. Then, the requesting party 202 may make a request for context information which is received at the admission control unit 208. This unit 208 is adapted to apply a policy on the context request to determine whether the requesting party 202 is authorised to receive context information of the object of interest. The policy has been defined basically by the context owner, e.g. a network operator. If so, the admission control unit 208 triggers the distributor 218 to provide the latest context information to the requesting party 202. The policy may also dictate that a particular requester is allowed to receive only some part of the available context information. It should be noted that the context request may be a request for a subscription to receive context information from the context server on a more or less continuous basis.

Typically, the context information pertains to an individual object, e.g. a person. However, an object may also belong to a group of objects, e.g. persons, having an aggregate profile shared by its members. A group membership per se may be regarded as a parameter in an individual context. For example, members of a family may each have an individual context while the family may have a common context with an aggregate profile shared by its members. Today, no mechanism is available for creating an aggregated context for a group of individuals or devices.

Using the above-described solution of FIG. 2, the rules creating the refined context information are predefined and fixed, and the refined context information can be provided to any authorised requesting party. In this way, the requesting party can only receive context according to its predefined form, which is sometimes a problem since it may not be exactly what the requesting party needs or desires. However, no flexible solution is available today for meeting the particular needs of a requesting party, being limited to the predefined context refinements only. The requesting party will also receive all the available context information, sometimes limited by the policy, even though parts of it may not be needed.

Moreover, group membership can only be expressed today as a parameter in individual contexts. However, a group may exist regardless of whether its members are active or not and may persist even when its members actually leave the group. This may cause problems when a group membership is a parameter in an individual context, since the aggregate profile of that group's context is disregarded in an individual context.

It is also sometimes desirable for a group of users to collectively obtain context information, which can be a tedious procedure using the existing solution since its members may have different needs and preferences. In another practical example, a group of users intend to visit a restaurant together and may invoke a telecommunication service providing information on available restaurants and their menus, e.g. based on user locations and preferences. Each user in the group can then invoke such a service and typically receive different results depending on differences in location and preferences. It is then up to the users to coordinate the results and agree on a restaurant that satisfies all users in the group, which naturally may be difficult and time wasting.

To conclude, more flexibility in context servers is desirable when providing context information, and it is also desirable to handle group contexts more efficiently. Further, a useful solution is needed for providing relevant context information on an object of interest to a group requiring a minimum of efforts from its members.

SUMMARY OF THE INVENTION

The object of the present invention is to reduce or eliminate the problems outlined above. In particular, it is an object of the present invention to provide a solution for meeting specific needs and requirements of a requesting party when obtaining context information from a context server.

This object and others are achieved primarily by providing a method and apparatus for obtaining context information from a context server maintaining a context for an object of interest in a telecommunication network, said context server receiving raw context data from sensors associated with the object of interest.

In the inventive method, a request for refined context information with reference to said object of interest, is received from a requesting party. Individual context data is collected for at least one individual entity of the requesting party, and a customized rule is created on the basis of the received individual context data. The rule defines conditions in an adapted request for refined context information regarding the object of interest. The adapted request including the customized rule is then sent to the context server of the object of interest. Finally, context data refined according to the rule is received from the context server.

The individual context data is preferably collected from at least one context manager maintaining a context for said individual entity or entities. If the requesting party is a group of plural individual entities, individual context data is collected for each of the individual entities, the received individual context data is aggregated into a group context, and the customized rule is created from the group context.

Preferably, a context template structure is used for collecting the individual context data. The template comprises predefined data fields for parameters of relevance to the requesting party which are filled with current context data of the requesting party. The context template may be presented as an XDM document communicated by means of an IMS interface using a SIP/Simple protocol. The context template can be created by extending a generic template, comprising standard fields for basic data defining a requesting party in general, into an applied template further comprising fields for the context parameters. In the case when the requesting party is a group of plural individual entities, the generic template may include standard fields for a group identity, group members and optionally a group administrator, if used. The applied template may also include parameter fields for each of the individual entities.

The inventive apparatus comprises means for receiving, from a requesting party, a request for refined context information with reference to said object of interest. The apparatus further comprises a context gathering unit adapted to collect individual context data for at least one individual entity of the requesting party. The apparatus further comprises a context aggregation unit adapted to create a customized rule on the basis of the received individual context data. The rule defines conditions in an adapted request for refined context information regarding the object of interest. The apparatus further comprises means for sending the adapted request including the customized rule to the context server of the object of interest, and means for receiving, from the context server, context data refined according to that rule.

The context gathering unit is preferably further adapted to collect individual context data from at least one context manager maintaining a context for said individual entity or entities. In the case when the requesting party is a group of plural individual entities, the context gathering unit is further preferably adapted to collect individual context data for each of the individual entities. The context aggregation unit is further preferably adapted to aggregate the received individual context data into a group context and to create the customized rule from the group context.

The context gathering unit may be further adapted to use a context template structure for collecting the individual context data. The template comprises predefined data fields for parameters of relevance to the requesting party to be filled with current context data of the requesting party. The context gathering unit is preferably further adapted to use an XDM document as the context template communicated by means of an IMS interface using a SIP/Simple protocol. The context gathering unit may be further adapted to create the context template by extending a generic template, comprising standard fields for basic data defining a requesting party in general, into an applied template further comprising fields for the context parameters. In the case when the requesting party is a group of plural individual entities, the generic template may include standard fields for a group identity, group members and optionally a group administrator, if used. The applied template may also include parameter fields for each of the individual entities.

The present invention further embraces a method of providing context information from a context server maintaining a context for an object of interest in a telecommunication network, the context server receiving raw context data from sensors associated with the object of interest. According to the latter method, an adapted request is received, originating from a requesting party for refined context information regarding the object of interest. The adapted request includes a customized rule that has been created on the basis of collected individual context data for at least one individual entity of the requesting party, the rule defining conditions in the adapted request. The raw context data is refined by applying the received customized rule, and the refined context information is finally provided for delivery to the requesting party. The received customized rule has preferably been derived from a group context aggregated from a plurality of individual contexts of group members.

The present invention further embraces a corresponding apparatus for providing context information from a context server maintaining a context for an object of interest in a telecommunication network, the context server receiving raw context data from sensors associated with the object of interest. The latter apparatus comprises means for receiving an adapted request originating from a requesting party for refined context information regarding the object of interest.

The adapted request includes a customized rule that has been created on the basis of collected individual context data for at least one individual entity of the requesting party, the rule defining conditions in the adapted request. The latter apparatus further comprises means for refining the raw context data by applying the received customized rule, and means for providing the refined context information for delivery to said requesting party. The received customized rule may have been derived from a group context aggregated from a plurality of individual contexts of group members.

It will be appreciated from the following description of preferred embodiments that the latter apparatus for providing context information from a context server can work together with the former apparatus for obtaining context information from a context server, so as to form a mutual inventive concept. The same applies also to the latter method of providing context information from a context server and the former method of obtaining context information from a context server. Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Briefly described, the present invention provides a solution where the particular needs of a requesting party can be met when providing relevant context information adapted thereto. In this solution, a "customized" rule can be created for the requesting party defining conditions for refined context information adapted to its own requirements and needs regarding a specific object of interest. As used herein, the term "rule" may represent any algorithm or the like that calculates certain parameters, draws conclusions or creates compilations from raw context data. Preferably, after receiving a request for refined context information from a requesting party, the customized rule may be defined by means of a context template comprising predefined data fields for parameters of relevance to the requesting party according to the request. The empty parameter fields in the template can then be filled with current context data of the requesting party.

Figure 1:
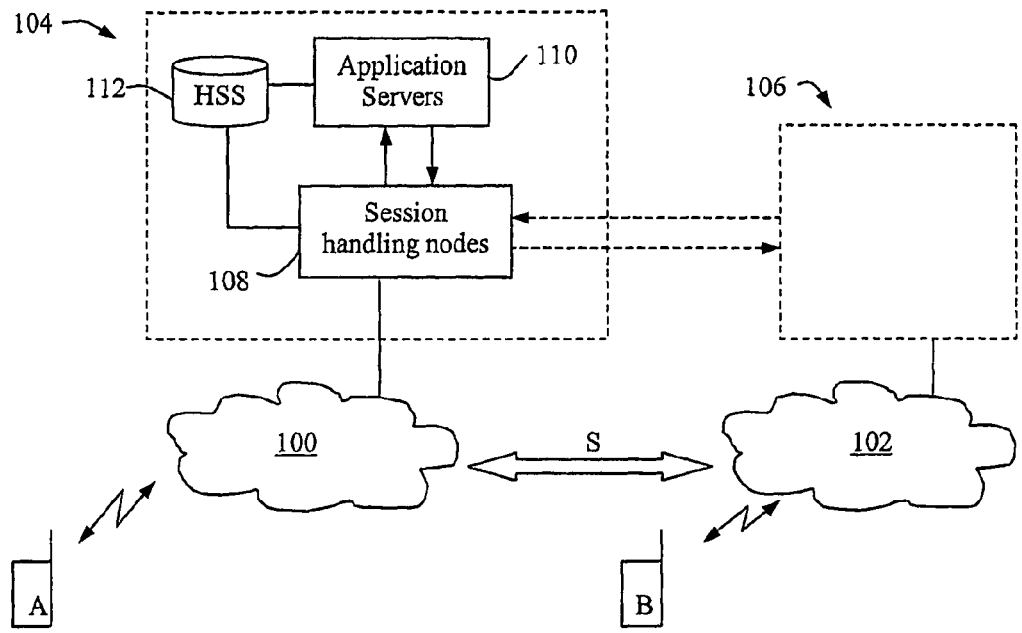
FIG. 1 is a basic network configuration for communicating multimedia, according to the prior art.
Figure 2:
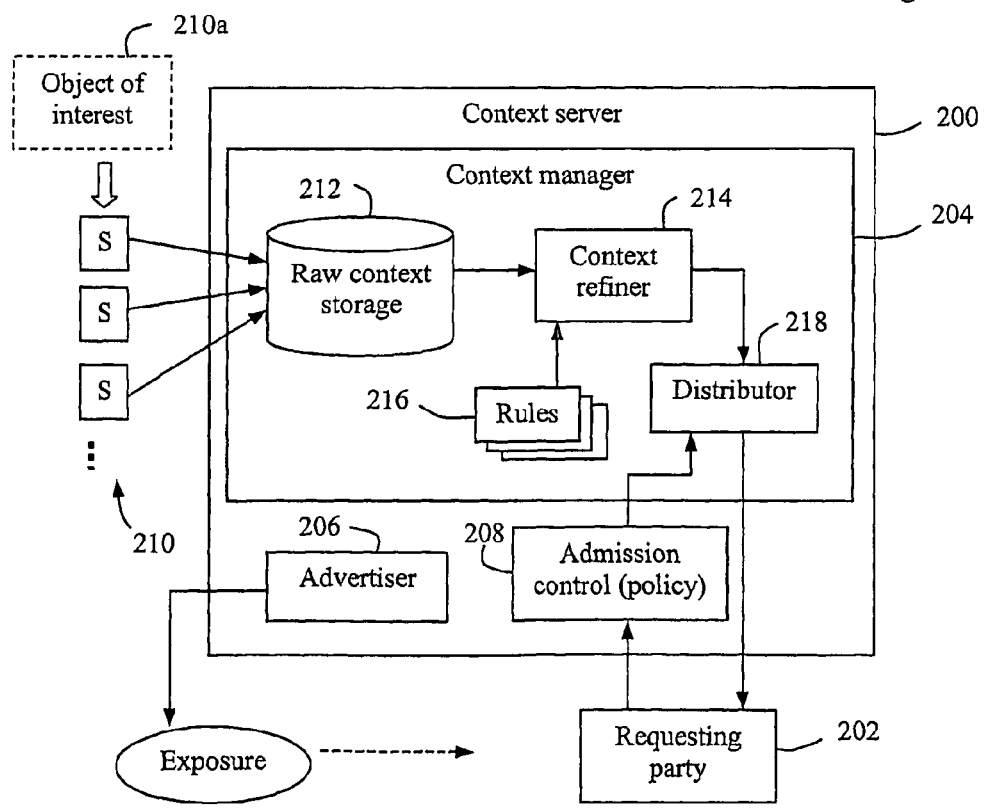
FIG. 2 is a block diagram of a context server generally providing refined context information to a requesting party, according to the prior art.

An adapted request for refined context information, including the customized rule as created from the filled template, is then submitted to a context server of the object of interest, e.g. like the one described in FIG. 2. The context server will then apply the new rule for refining received raw context data, in order to provide context information in the desired form to the requesting party. Thereby, the requesting party will not be limited to the predefined and fixed context refinements and rules, but can request for context information tailored to its own needs and requirements. The present invention can be used when the requesting party is either a sole individual or a plurality of individuals together making up a group, which will be described in more detail below.

The inventive procedure and arrangement for obtaining wanted context information from a context server will now be described by way of exemplary embodiments, initially with reference to FIG. 3. In this embodiment, a context server 300 is basically configured as the prior art context server 200 shown in FIG. 2, thus having a context manager 302 and an admission control function 304 based on a predefined policy. No advertiser function is shown in this figure although it may be included here as well. Likewise, the context manager 302 includes a context storage unit 308 receiving and storing raw context data coming from sensors 306 associated with the object of interest 306a. The stored raw data is then processed in a context refiner 310 according to predefined rules 312, in order to produce refined context information, basically in the same manner as described for FIG. 2, to be provided to any authorised requesting party by means of a distributor 314.

In this example, a requesting party is composed of a group of individuals 316, here shown as entities A,B,C . . . , and a group context valid to its members is created by means of an "aggregated context function" 318, which may be implemented in a server or the like in a service network, e.g. an IMS network. However, the mechanisms described below could be used for a sole requesting entity as well. In the embodiments described here, the aggregated context function will generally be considered as a node.

Each individual A,B,C . . . has in turn an associated context manager $CM_A$, $CM_B$, $CM_C$, . . . 320 maintaining a context on behalf of its associated individual, basically in the same manner as the context server 302 does on behalf of the object of interest 306a. For example, if the individuals A,B,C . . . are mobile users, their contexts may include specifics regarding their terminal capabilities, current status, personal preferences and current position, although the present invention is not limited in this respect. Hence, each context manager 320 receives raw context data from sensors, not shown, associated with the respective individual 316.

In the present solution, the aggregated context function 318 creates an aggregated group context that is collectively valid for all members 316 of the group, at least in some respects, e.g., that the members have agreed upon when forming the group. Alternatively, an existing group may be imported where the group memberships are already fixed. Here, it is assumed that the group has been formed and the aggregated context function 318 has received a request for context information from the group, which will be described in more detail later below. In a first illustrated step 3:1, the aggregated context function 318 collects individual context information from each of the context managers $CM_A$, $CM_B$, $CM_C$, . . . 320. In the case of a very large group, a proxy (not shown) can be used to receive numerous context updates from the context managers 320 of the group individuals, in order to avoid overloading of the aggregated context function 318. The proxy may then select and forward only updates with changes significant to the interests of the group, thereby acting as a filter. The proxy may thus be configured to only forward context changes "important" to the request made, as for example changes of user position exceeding a certain limit.

An aggregated group context is then created in the aggregated context function 318 on the basis of the individual contexts received in step 3:1, preferably by using a context template as mentioned above which will also be described in more detail later below. A corresponding customized rule is then defined and sent to the context server 300 as an adapted request for refined context information, in a next step 3:2. This rule is thus a combined result of the aggregated group context and the initially received request from the requesting party. The customized rule thus represents in effect a request to the context server 300 for refined context information in a form adapted to the requirements and needs of the group members as dictated by their contexts.

If this solution is implemented in an IMS network, the rule/template can preferably be presented as an XDM (XML Data Management) document which is a specialised language for the management of lists in IMS environments. The XDM-defined rule may then be communicated by means of an IMS interface using a SIP/Simple protocol between the aggregated context function 318 and the context server 300, although other transport means are also possible. Further, the aggregated context function 318 may be implemented in a Presence and Group Management server (PGM) as defined for IMS networks.

In another tangible example, a customized rule may be defined as conditions in a request from a group of mobile users for a suitable meal at a restaurant. The rule should then be defined to satisfy the preferences of all group members, or at least as many as possible, and can be derived from the aggregation of their individual contexts. For example, a first member may be allergic to peanuts, a second member may prefer rice and a third member may reject spicy food, etc. The created rule may then include the following request with conditions: "Propose any non-spicy meals containing rice but no peanuts". Further preferences regarding a cost limiting parameter may include member A: max 200 SEK, member B: max 250 SEK member C: max 300 SEK, etc. In the aggregated group context, the cost parameter would become: max 200 SEK, satisfying all members A-C.

Location information on the individual members may also be used to further define a requirement in the rule for the restaurant's locality, e.g. "Propose restaurants that fulfil the above condition located within 500 meters from a certain spot". As a service is then invoked using a context server providing information on available restaurants and their menus, the created rule is submitted thereto. The response from the context server may then comprise a list of any restaurants, preferably including menus, fulfilling the conditions set by the customized rule.

It should be understood from the examples given above that a person skilled in the art would be able to produce a logic for aggregating collected individual contexts into a group context and a customised rule, with respect to parameters relevant to the request.

Returning to FIG. 3, the created customized rule sent to context server 300 in step 3:2 is checked at the admission control unit 304 to determine if the request is authorised according to a prevailing policy. Assuming that this is the case, the new rule 312a is added to the existing rules 312 in the context manager 302 in a step 3:3, in order to produce refined context information according to the conditions and requirements in the rule 312a. Rule 312a is thus applied in the context refiner 310 in a step 3:4, and the distributor 314 then provides the refined context, as being prepared according to the rule 312a, as a response to the aggregated context function 318, in a further step 3:5. The aggregated context function 318 can then finally hand out the information results to any of the individual entities 316, e.g. according to a predetermined scheme, in a final step 3:6. The results may also be conveyed to a separate application server 322 or the like that can be accessed by any individual 316 for obtaining said results.

Figure 3:
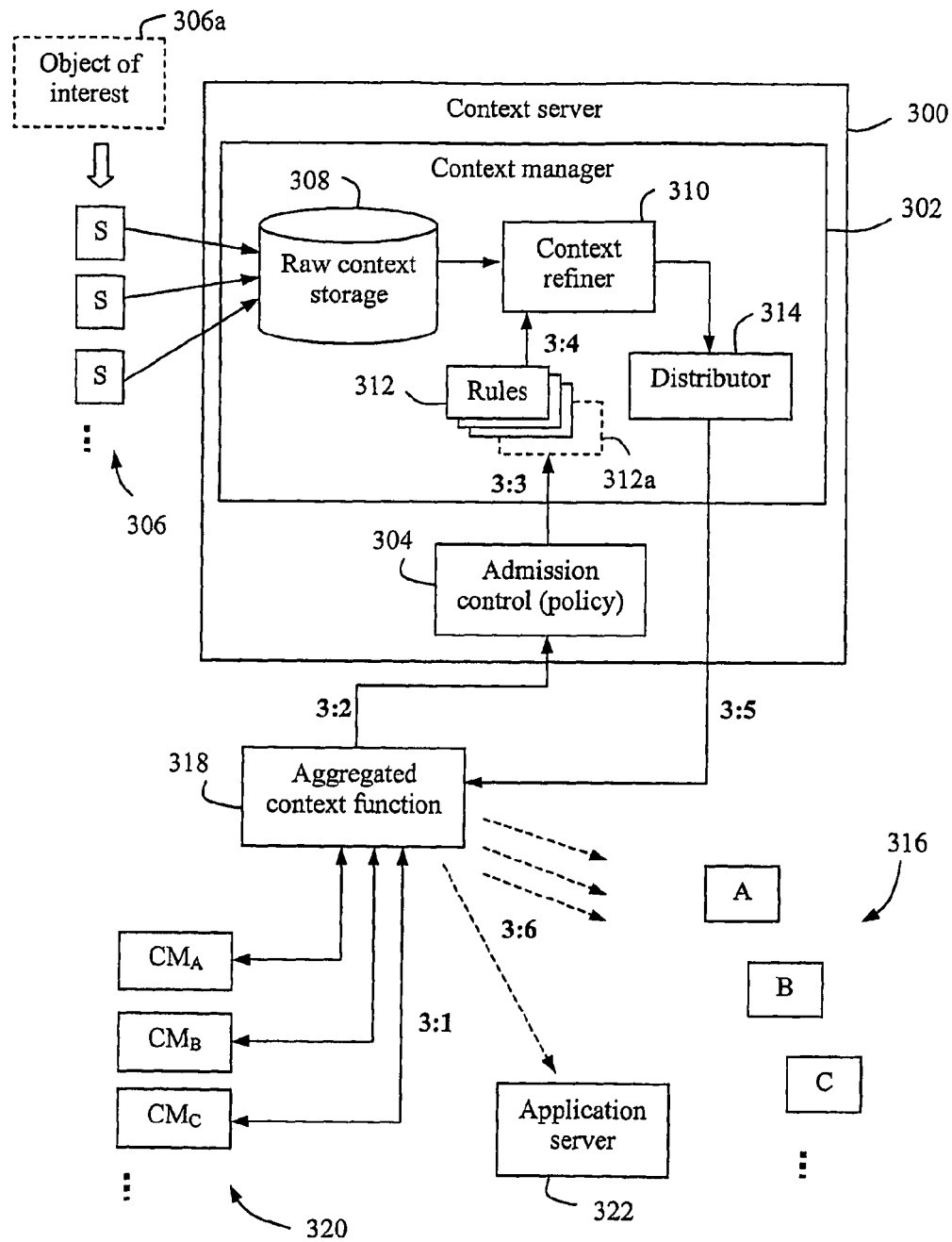
FIG. 3 is a block diagram of a communication scenario where refined context information is obtained for a group of individuals from a context server, in accordance with one embodiment.
Figure 4:
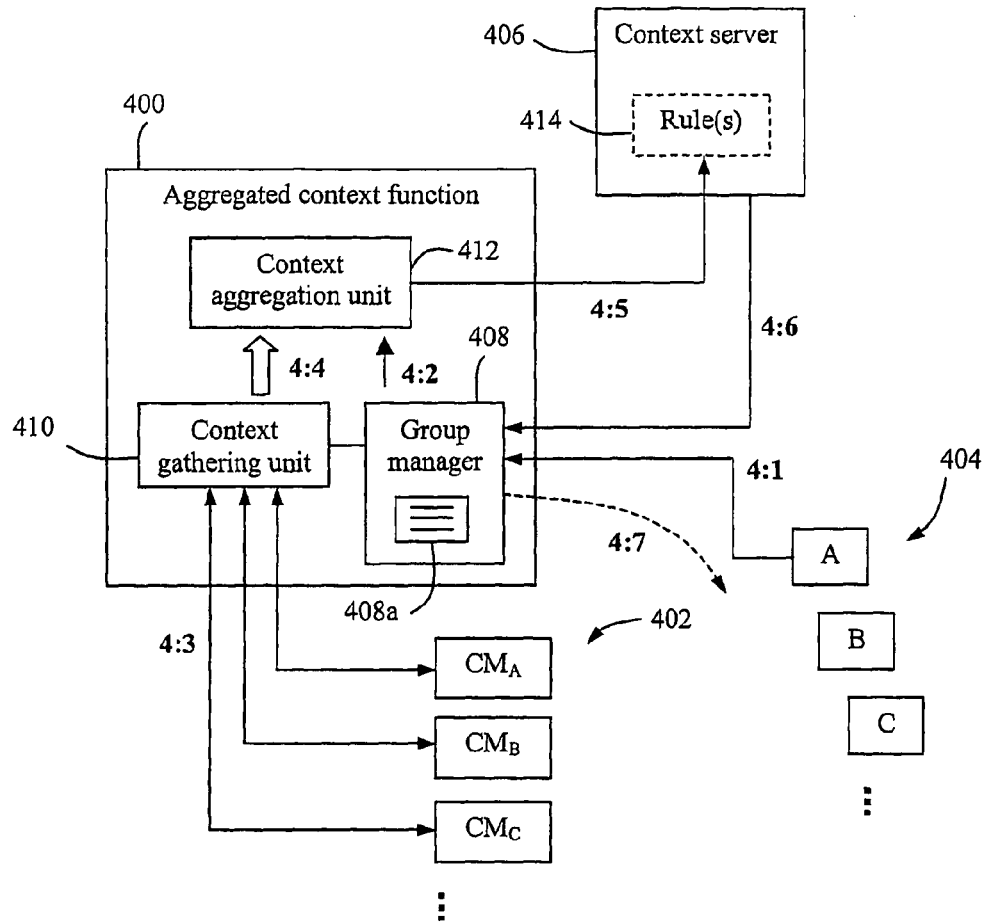
FIG. 4 is a block diagram of a communication scenario where refined context information is obtained for a group of individuals from a context server, in accordance with another embodiment.

FIG. 4 illustrates a procedure and arrangement for obtaining refined context information from a context server, as similar to the scenario of FIG. 3, with the aggregated context function 400 being illustrated in more detail. As in FIG. 3, the aggregated context function 400 collects individual contexts from context managers 402 associated with a group of individual entities 404, and sends a customized rule to context server 406. In this embodiment, the aggregated context function 400 includes a group manager 408, a context gathering unit 410 and a context aggregation unit 412, to be described below.

In a first step 4:1, an entity A out of a group of individual entities 404 sends a request for context information with reference to an object of interest, on behalf of a specified group, to the aggregated context function 400. The request may be drawn up depending on what is offered, e.g. from an exposure mechanism as described for FIG. 2, or depending on what may generally be of interest to the group. As mentioned above, the group may be a new one or an imported existing one. If the individuals 404 are mobile users, one of them may take the initiative to make a request for a group having mutual interests in some respect, e.g. for having a meal together at lunchtime. Alternatively, a separate service managing unit or administrator, not intended to be a group member itself, may send the context information request, e.g. if the individual entities 404 are correlated applications for enabling a communication service or the like.

In any case, the request for context information to a group is received by a group manager 408 which defines and maintains the group in a data structure 408a, e.g. comprising a member list or the like. Any parameters determining a context for the group may also be defined in the group manager 408, such as current states and preferences. Preferably, only parameters relevant to the context information request are defined. In one embodiment, a context template structure may be defined with fields for these parameters, to be filled with current context information, which will be further described later below.

In a next step 4:2, the context information request is conveyed to the context aggregation unit 412 to be used later, as will be described below. As the group has been created and activated by the group manager 408, the context gathering unit 410 collects current individual context data from the context managers $CM_A$, $CM_B$, $CM_C$, . . . 402 associated with their respective individuals 404, in a following step 4:3, just as in step 3:1 of FIG. 3. It should be noted that the order of steps 4:2 and 4:3 could be reversed.

The gathered contexts are then conveyed to the context aggregation unit 412, in a step 4:4, which then aggregates the individual contexts into a common group context. Combined with the context information request conveyed in step 4:2, the group context can be translated into conditions in an adapted request for refined context information from the context server 406. These conditions can be expressed as a customized rule that the unit 412 creates. The context aggregation unit 412 then sends the rule 414 as a request to context server 406, in a next step 4:5, the rule thus defining the conditions for the request. After refining raw context data, basically as described for step 3:4 in FIG. 3, the context server 406 provides context information refined according to the submitted rule 414, back to the group manager 408, in a step 4:6. Finally, as illustrated in a step 4:7, the group manager 408 can send out the information results to any of the individual entities 404, e.g. according to some predefined scheme, or to an accessible application server or the like, although the present invention is not limited in this respect.

Figure 5:
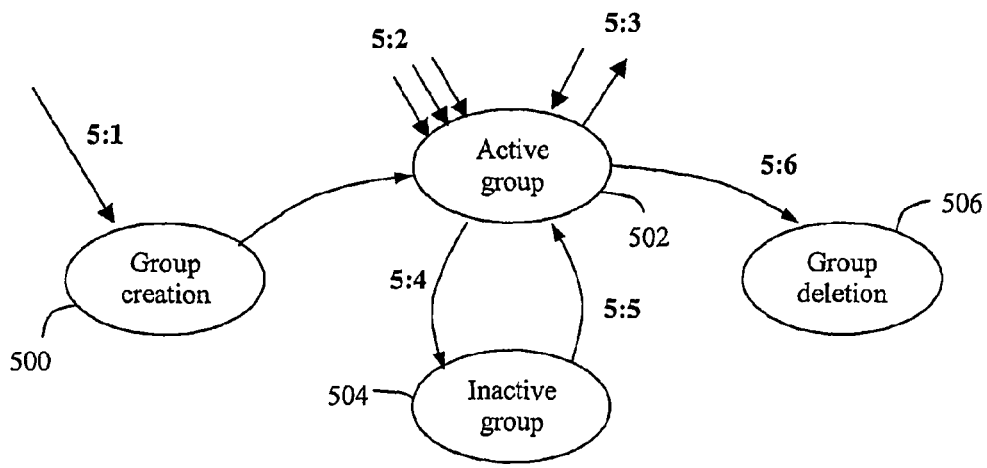
FIG. 5 is a state diagram for a group of individuals as handled by a group manager when obtaining refined context information for said group, in accordance with yet another embodiment.

FIG. 5 is a state diagram for a group according to another embodiment. The group can preferably be maintained by the group manager 408 shown in FIG. 4. In a first state 500, the group is created in response to a group formation trigger 5:1, which may be a context information request for a specified group from a user, an appointed group administrator or a service application manager, as mentioned above. Group creation includes specifying its members and defining parameters of interest, etc.

When the process of creating the group is completed, the group enters an active state 502 where current individual context data can be received and updated, as indicated by arrows 5:2. The group parameters may also be modified in the active state at any time during the lifetime of the group, as indicated by arrows 5:3, e.g. when memberships change for the group as members leave or join the group, or when the group profile or parameters are updated by its members or a group administrator, e.g., regarding preferences and policies etc.

The group may at any point during its lifetime enter an inactive state 504 in response to an inactivation trigger 5:4. In the inactive state, no context data or modifications can be received and the group is dormant until awoken by an activation trigger 5:5. The inactivation trigger 5:4 may come from a group member or administrator or may be the expiry of a predefined timeout limit, e.g. a limited total lifetime of the group or the time since the group received the latest new context data or modification. The activation trigger 5:5 may typically come from a group member or administrator. An activation trigger may also be the fulfilment of a predefined context condition, e.g. when a certain number of group members are located within a predetermined radius, etc. If this condition is fulfilled for only some of the group members, a subgroup of these members may be defined in an aggregated context function as being active.

The group may finally be resolved in response to a deletion trigger 5:6, typically from a member or administrator having determined that the group has become obsolete. A group deletion state 506 is then entered which is final. Alternatively, the deletion trigger may be a timeout parameter similar to the above-described inactivation trigger 5:4. The main difference is that the active state 502 can be entered from the inactive state 504, but not from the deletion state 506.

Figure 6:
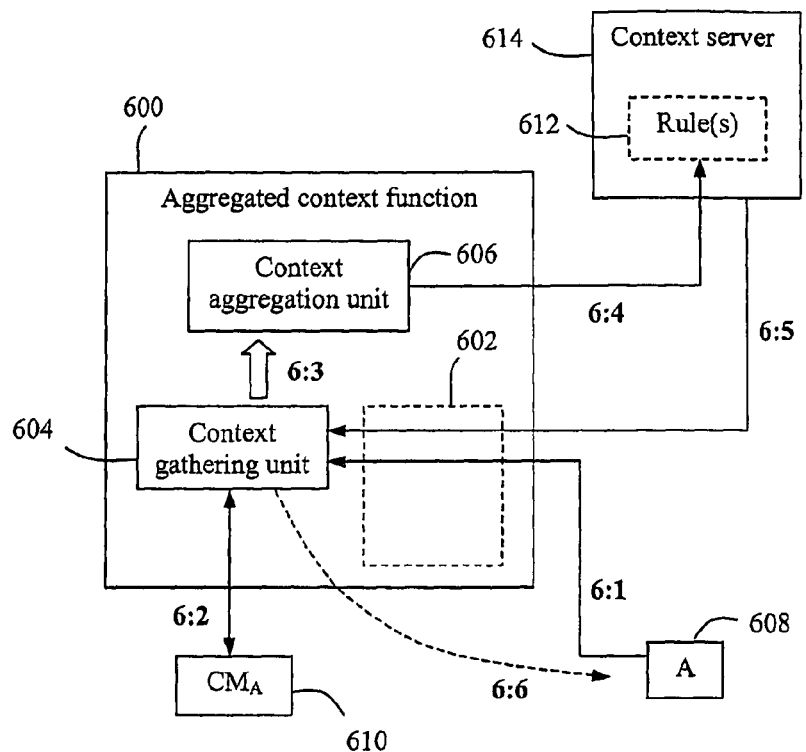
FIG. 6 is a block diagram of a communication scenario where refined context information is obtained for a sole individual from a context server, in accordance with yet another embodiment.

It will now be described how refined context information on an object of interest can be obtained from a context server associated therewith, when the requesting party is a sole individual, with reference to FIG. 6. An aggregated context function 600 is shown basically comprising the same components as function 400 in FIG. 4, namely a group manager 602, a context gathering unit 604 and a context aggregation unit 606.

A request for refined context information with reference to the object of interest is received from the sole individual A 608, in a first step 6:1. In this case as well, the context information request may be received from a separate service managing unit or administrator, not shown. Since no group is to be created and maintained for the sole individual 608, the group manager 602 can be bypassed, and the request can be directly conveyed to the context gathering unit 604. In response thereto, the context gathering unit 604 collects individual context data from a context manager $CM_A$ 610 associated with the individual 608, as illustrated by a step 6:2.

Parameters relevant to the context information request are also defined by the context gathering unit 604, preferably using a context template structure with parameter fields which are filled with the context data collected in step 6:2. Exemplary context template structures will be described in more detail below.

In a next step 6:3, the collected context information is conveyed to the context aggregation unit 606, preferably presented as a filled-in template, together with the context information request received in step 6:1. Unit 606 now aggregates the received individual context and the context information request by creating a customized rule 612 containing resultant conditions, as an adapted request for context information from the context server 614. The context aggregation unit 606 then sends the rule 612 as a request to context server 614, in a next step 6:4, the rule thus defining the conditions for the request.

After refining raw context data according to the received rule 612, the context server 614 provides refined context information back to the context gathering unit 604, in a step 6:5. It should be noted that the group manager 602 may once again be bypassed, as compared to the example of FIG. 4 described above, and is basically transparent throughout the process. In a final illustrated step 6:6, the context gathering unit 604 can send out the information results to the individual 608, or to an accessible application server or the like.

Figure 7A:
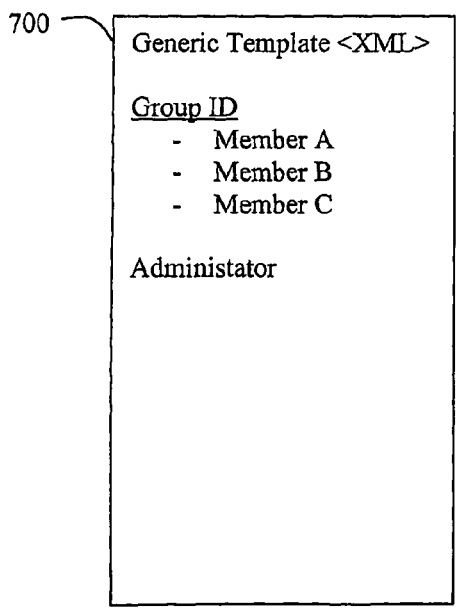
FIGS. 7a and 7b illustrate a generic template and an applied template, respectively, which can be used for creating a customized rule to obtain refined context information, in accordance with yet another embodiment.
Figure 7B:
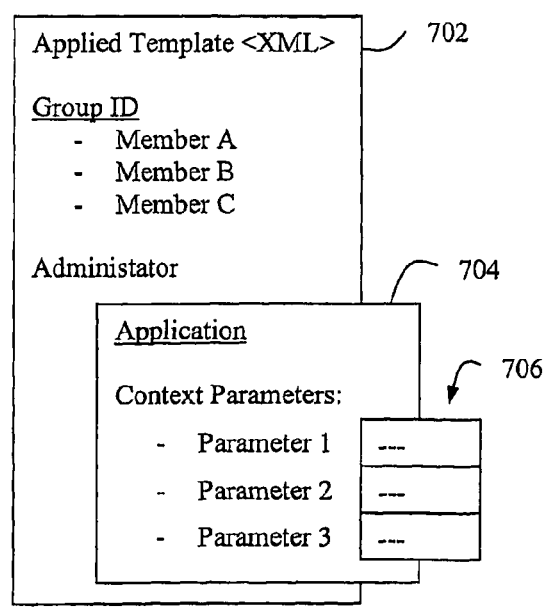

As mentioned above, a context template structure may preferably be defined with fields for parameters relevant to a received context information request. These parameter fields can thus be used for collecting and registering current individual contexts of members in a created group, or the context of a sole individual when applicable. The parameter fields are then filled with corresponding data from each collected context. FIGS. 7a and 7b illustrate a generic template structure and an applied template structure, respectively, in accordance with a preferred embodiment, here shown as XDM documents using XML.

A "generic template" data structure comprises standard fields for basic data defining a requesting party in general. The generic template 700 shown in FIG. 7a comprises such standard fields for a group identity, group members (here shown as fields for members A, B and C) and optionally a group administrator, if used. The fields for members and administrator should preferably accommodate suitable identities and network addresses for communication.

When a customized rule is to be created on behalf of a requesting party, in order to obtain refined context information from a context server as described above, parameters relevant to the context information request are to be defined. This can be done by extending the generic template 700 to become an "applied template" 702 shown in FIG. 7b, by adding an application specific part 704 for an application used for the request. Part 704 includes an application name and fields 706 for one or more defined context parameters 1, 2, 3 . . . relevant to that application and to the request. In the applied template 702, the empty parameters fields 706 can now be filled with collected context information for each member during the context gathering process, e.g. as described for step 4:3 in FIG. 4 or step 6:2 in FIG. 6.

Figure 8:
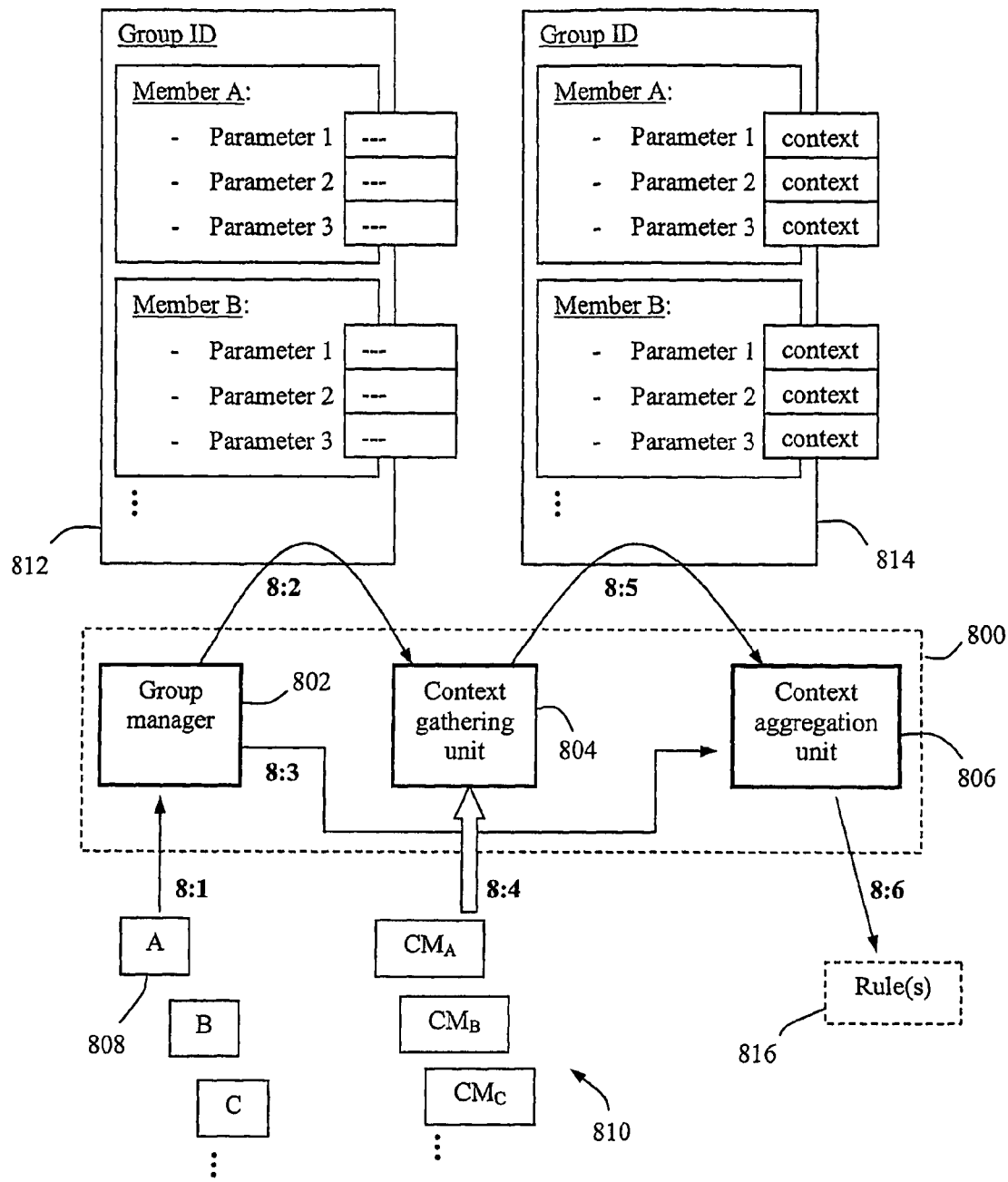
FIG. 8 illustrates how a template is handled within a aggregated context function, in accordance with yet another embodiment.

FIG. 8 illustrates an example of how such template structures can be used in an aggregated context function 800, similar to the one denoted 400 in FIG. 4, comprising a group manager 802, a context gathering unit 804 and a context aggregation unit 806. In a first step 8:1, group manager 802 receives a context information request from a requesting party 808, in this case a group of plural individuals A,B,C . . . of which A makes the request. After defining parameters relevant to the context information request, group manager 802 takes a generic template, shown in FIG. 7a, as a starting point for creating an applied template structure 812 including, for each group member, fields for the defined parameters which are initially empty, as shown.

The applied template 812 is then conveyed to the context gathering unit 804, in a step 8:2. Further, the context information request received in step 8:1 is also conveyed to the context aggregation unit 806, in a step 8:3. The context gathering unit 804 now collects individual contexts from context managers 810 associated with the group members, in a next step 8:4. When doing this, it fills the parameter fields of the applied template with the collected context for each group member. It should be noted that it may well happen that not all parameters are available for some individual entities, such that some fields will remain empty on information. It is further possible to define some parameters as "mandatory" and others as "optional". If any entity fails to provide context information for a mandatory one, the resulting behaviour may depend on the situation and/or application used. When the context collecting process is completed, the filled-in template 814 is conveyed to the context aggregation unit 806, in a next step 8:5.

In a final step 8:6, unit 806 creates a customized rule 816 on the basis of the context information in the template 814 received in step 8:5 and the request received in step 8:3. The rule 816 can then be submitted to the context server in order to obtain refined context information therefrom basically in the manner described for FIG. 3.

Figure 9:
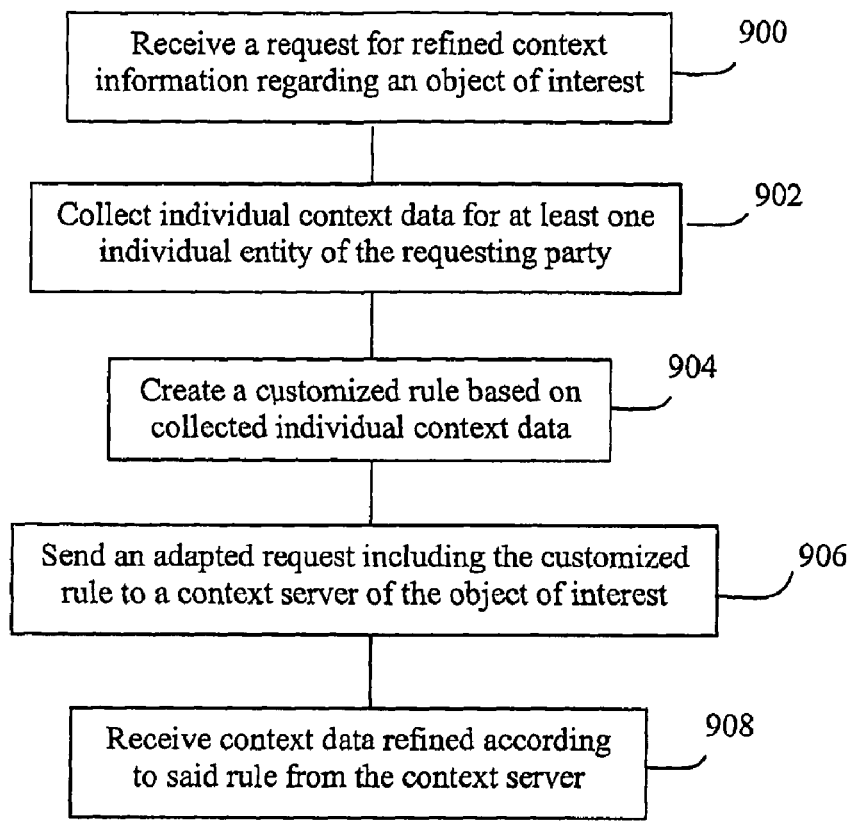
FIG. 9 is a flow chart illustrating a procedure for obtaining wanted context information from a context server maintaining a context for an object of interest, as executed by an aggregated context function.

According to one aspect of the present invention, a method is provided for obtaining context information from a context server, e.g. 300, 406 or 614, maintaining a context for an object of interest, e.g. 306a, in a telecommunication network. A general procedure for this, as performed by an aggregated context server described for FIGS. 3,4,6 and 8, will now be described with reference to a flow chart shown in FIG. 9. It is assumed that the context server receives raw context data from sensors, e.g. 306, associated with the object of interest.

In a first step 900, a request for refined context information regarding an object of interest is received from a requesting party, representing either a sole individual or a group with plural individuals.

In a next step 902, individual context data is collected for at least one individual entity of the requesting party, preferably from either a content server of a sole individual or plural content servers of individuals in a group. Preferably, a context template structure is used comprising predefined data fields for parameters of relevance to the requesting party according to the request. The parameter fields are then filled with current context data of the requesting party for each individual.

In a next step 904, a customized rule is created based on collected individual context data, and also with respect to the request received in step 900. As described above, a customized rule may be created by means of the filled-in template.

In a next step 906, an adapted request for refined context information regarding the object of interest, including the customized rule, is sent to the context server maintaining the context for the object of interest.

In a final step 908, context data refined according to said rule is received from the context server, to be delivered to the requesting party.

Figure 10:
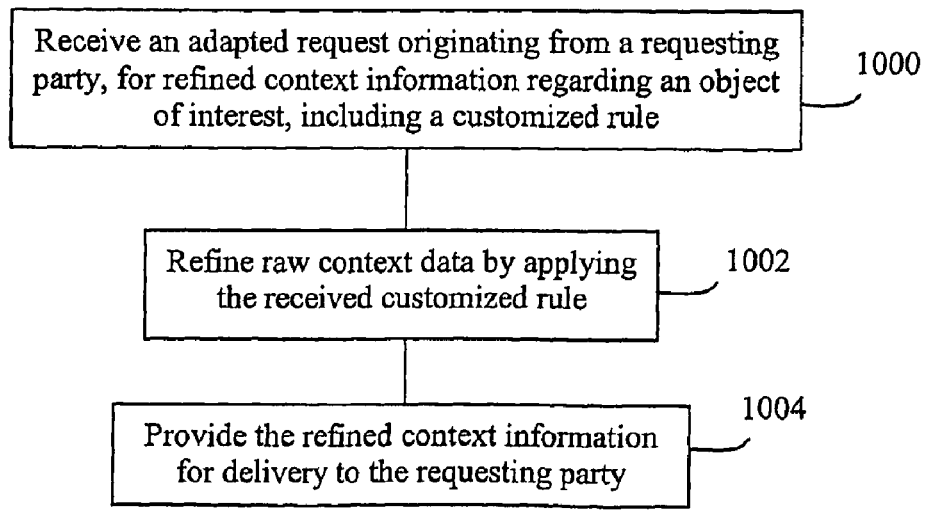
FIG. 10 is a flow chart illustrating a procedure for providing wanted context information, as executed by a context server maintaining a context for an object of interest.

According to another aspect of the present invention, a method is provided for providing context information from a context server maintaining a context for an object of interest, e.g. 306a, in a telecommunication network. A general procedure for this, as performed by a context server, e.g. 300, 406 or 614 as described for FIGS. 3,4 and 6, respectively, will now be described with reference to a second flow chart shown in FIG. 10. The context server receives raw context data from sensors, e.g. 306, associated with the object of interest.

In a first step 1000, an adapted request for refined context information regarding the object of interest is received, the request originating from a requesting party. The adapted request includes a customized rule (312a,414) that has been created on the basis of collected individual context data for at least one individual entity (316,404) of said requesting party, the rule defining conditions in the adapted request.

In a next step 1002, received raw context data is refined by applying the received customized rule.

In a final step 1004, the refined context information is provided for delivery to said requesting party. According to the above-described embodiments, the refined context information is sent to an aggregated context function which then delivers it to the requesting party, e.g. to one or more individuals or to a separate accessible application server.

It should be noted that the above-described mechanism can be configured in different ways within the scope of the present invention, depending on the field of application and other factors. In another tangible example, the requesting party may be a group of mobile users wishing to activate a communication service known as PoC (Push-to-talk over Cellular) in which plural users can communicate collectively by pushing a button to open a channel in order to talk. In this case, the object of interest is comprised of network resources to enable the PoC communication. The network resources are typically owned and/or controlled by a network operator who also controls the associated context server including its policy for admission control. In order to optimise the resource usage, available capabilities of the users in the group should be determined before invoking the service. The following procedure A)-G) may then be executed, e.g. using the configurations shown in FIG. 3 or FIG. 4:

A) The group is created or imported into a group context function, e.g. in the group manager 408.

B) A group context is created by aggregating individual contexts, e.g. in the context aggregation unit 412. If the service requires resources, a request for a specified group application associated with the service invokes the procedure for gathering context and creating a customized rule.

C) A customized rule is created to ascertain the communication resources allowed for the service and the capabilities of the users to use the service. Conditions in the rule thus reflect the user's situations.

D) The customized rule is sent to the context server maintaining a context for the network resources.

E) The customized rule is processed in the context server, e.g. server 300 or 406, once it has been verified by the admission control policies, e.g. admission control 304. The rule is applied to refine raw context data, in this case network information, and determines the resources the users are allowed to reserve.

F) A reply with the refined context is sent from the context server, e.g. by means of distributor 314, to the aggregated context function, and is further distributed to the group members. This may be expressed as a resource reservation rule for a service policy decision point (PDP) which is a known network entity for distributing network resources.

G) When the users finally invoke the service, they can send the resource reservation rule to a PDP for the given service.

To conclude, the present invention provides a solution for meeting specific needs and requirements of a requesting party when generally obtaining context information from a context server regarding an object of interest. Moreover, a mechanism is provided for handling group contexts effectively, and relevant context information can be obtained that is relevant to collective needs and requirements of a group.

While the invention has been described with reference to specific exemplary embodiments, the description is generally only intended to illustrate the inventive concept and should not be taken as limiting the scope of the invention, which is defined by the appended claims.

The invention claimed is:

1. A method of obtaining context information from a context server maintaining a context for an object of interest in a telecommunication network, said context server receiving raw context data from sensors associated with the object of interest and processing the raw context data in a context refiner according to predefined rules in order to derive or calculate refined context information from the raw context data, comprising the following steps:
   receiving, from a requesting party, a request for refined context information with reference to said object of interest,
   collecting individual context data for at least one individual entity of said requesting party, using a context template structure, said context template structure comprising predefined data fields for parameters of relevance to the requesting party which are filled with current context data of the requesting party,
   creating a customized rule on the basis of the received individual context data by aggregating the collected individual context data and the received context information request, said customized rule defining conditions in an adapted request for refined context information regarding the object of interest,
   sending said adapted request including the customized rule to the context server of said object of interest, wherein the context server produces refined context information from the raw context data according to the customized rule, and
   receiving, from the context server, context information refined according to said customized rule,
   wherein the raw context data associated with the object of interest comprises at least one variable characterizing a current state, status or situation of the object of interest, and
   wherein the individual context data comprises at least one variable characterizing a current state, status or situation of the at least one individual entity of said requesting party.

2. A method according to claim 1, wherein said individual context data is collected from at least one context manager maintaining a context for said individual entity or entities.

3. A method according to claim 1, wherein the requesting party is a group of plural individual entities, wherein individual context data is collected for each of the individual entities, the received individual context data is aggregated into a group context, and said customized rule is created from the group context.

4. A method according to claim 1, wherein the context template is presented as an XDM document communicated by means of an IMS interface using a SIP/Simple protocol.

5. A method according to claim 1, wherein the context template is created by extending a generic template, comprising standard fields for basic data defining a requesting party in general, into an applied template further comprising fields for said context parameters.

6. A method according to claim 5, wherein the requesting party is a group of plural individual entities, wherein the generic template includes standard fields for a group identity, group members and optionally a group administrator, if used.

7. A method according to claim 5, wherein the requesting party is a group of plural individual entities, wherein the applied template includes parameter fields for each of the individual entities.

8. An apparatus for obtaining context information from a context server maintaining a context for an object of interest in a telecommunication network, said context server receiving raw context data from sensors associated with the object of interest and processing the raw context data in a context refiner according to predefined rules in order to derive or calculate refined context information from the raw data, wherein said apparatus includes a computer, said apparatus further comprising:
   means for receiving, from a requesting party, a request for refined context information with reference to said object of interest,
   a context gathering unit adapted to collect individual context data for at least one individual entity of said requesting party, using a context template structure, said context template structure comprising predefined data fields for parameters of relevance to the requesting party which are filled with current context data of the requesting party,
   a context aggregation unit adapted to create a customized rule on the basis of the received individual context data by aggregating the received individual context data and the received context information request, said customized rule defining conditions in an adapted request for refined context information regarding the object of interest,
   means for sending said adapted request including the customized rule to the context server of said object of interest, wherein the context server produces refined context information from the raw context data according to the customized rule, and
   means for receiving, from the context server, context information refined according to said customized rule,
   wherein the raw context data associated with the object of interest comprises at least one variable characterizing a current state, status or situation of the object of interest, and
   wherein the individual context data comprises at least one variable characterizing a current state, status or situation of the at least one individual entity of said requesting party.

9. An apparatus according to claim 8, wherein the context gathering unit is further adapted to collect individual context data from at least one context manager maintaining a context for said individual entity or entities.

10. An apparatus according to claim 8, wherein the requesting party is a group of plural individual entities, wherein the context gathering unit is further adapted to collect individual context data for each of the individual entities, and that the context aggregation unit is further adapted to aggregate the received individual context data into a group context and to create said customized rule from the group context.

11. An apparatus according to claim 8, wherein the context gathering unit is further adapted to use an XDM document as the context template communicated by means of an IMS interface using a SIP/Simple protocol.

12. An apparatus according to claim 8, wherein the context gathering unit is further adapted to create the context template by extending a generic template, comprising standard fields for basic data defining a requesting party in general, into an applied template further comprising fields for said context parameters.

13. An apparatus according to claim 12, wherein the requesting party is a group of plural individual entities, wherein the generic template includes standard fields for a group identity, group members and optionally a group administrator, if used.

14. An apparatus according to claim 12, wherein the requesting party is a group of plural individual entities, wherein the applied template includes parameter fields for each of the individual entities.

15. A method of providing context information from a context server maintaining a context for an object of interest in a telecommunication network, the context server receiving raw context data from sensors associated with the object of interest and processing the raw context data in a context refiner according to predefined rules in order to derive or calculate refined context information from the raw data, comprising the following steps:
receiving an adapted request originating from a requesting party for refined context information regarding the object of interest, including a customized rule that has been created on the basis of collected individual context data for at least one individual entity of said requesting party using a context template structure, said context template structure comprising predefined data fields for parameters of relevance to the requesting party which are filled with current context data of the requesting party, by aggregating the received individual context data and the received context information request, the customized rule defining conditions in the adapted request,
producing refined context information from the raw context data according to the received customized rule, and
providing the context information refined according to said customized rule for delivery to said requesting party,
wherein the raw context data associated with the object of interest comprises at least one variable characterizing a current state, status or situation of the object of interest, and
wherein the individual context data comprises at least one variable characterizing a current state, status or situation of the at least one individual entity of said requesting party.

16. A method according to claim 15, wherein the received customized rule has been derived from a group context aggregated from a plurality of individual contexts of group members.

17. An apparatus for providing context information from a context server maintaining a context for an object of interest in a telecommunication network, the context server receiving raw context data from sensors associated with the object of interest and processing the raw context data in a context refiner according to predefined rules in order to derive or calculate refined context information from the raw data, wherein said apparatus includes a computer, said apparatus further comprising:
means for receiving an adapted request originating from a requesting party for refined context information regarding the object of interest, including a customized rule that has been created on the basis of collected individual context data for at least one individual entity of said requesting party using a context template structure, said context template structure comprising predefined data fields for parameters of relevance to the requesting party which are filled with current context data of the requesting party, by aggregating the received individual context data and the received context information request, the customized rule defining conditions in the adapted request,
means for producing refined context information from the raw context data according to the received customized rule, and
means for providing the context information refined according to said customized rule for delivery to said requesting party,
wherein the raw context data associated with the object of interest comprises at least one variable characterizing a current state, status or situation of the object of interest, and
wherein the individual context data comprises at least one variable characterizing a current state, status or situation of the at least one individual entity of said requesting party.

18. An apparatus according to claim 17, wherein the received customized rule has been derived from a group context aggregated from a plurality of individual contexts of group members.

19. A method of obtaining refined context information in a telecommunications network, comprising:
receiving a request from a requesting party for refined context information with reference to an object of interest,
receiving at least one parameter of relevance from said requesting party,
collecting context information for at least one of said requesting party using a context template structure, said context template structure comprising predefined data fields for parameters of relevance to the requesting party which are filled with current context data of the requesting party, and at least one entity according to said at least one parameter of relevance,
aggregating said request for refined context information with said collected context information to create a customized rule,
refining raw context data associated with said object of interest according to said customized rule, and
sending said refined context data to said requesting party,
wherein the context information comprises at least one variable characterizing a current state, status or situation of the at least one of said requesting party, and
wherein the raw context data associated with the object of interest comprises at least one variable characterizing a current state, status or situation of the object of interest.

* * * * *